Jan. 2, 1968     E. I. GORDON ET AL     3,361,990
FREQUENCY STABILIZATION APPARATUS FOR OPTICAL MASERS
Filed June 22, 1964     4 Sheets-Sheet 1

INVENTORS: E. I. GORDON
E. F. LABUDA
A. D. WHITE

BY Ralph M Braunstein

ATTORNEY 3,361,990
FREQUENCY STABILIZATION APPARATUS
FOR OPTICAL MASERS
Eugene J. Gordon, Convent Station, Edward F. Labuda, Madison, and Alan D. White, Berkeley Heights, N.J., assignors to Bell Telephone Laboratories, Incorporated, New York, N.Y., a corporation of New York
Filed June 22, 1964, Ser. No. 376,960
10 Claims. (Cl. 331—94.5)

This invention relates to optical masers and, more particularly, to apparatus for stabilizing the output frequency of optical masers with respect to a predetermined frequency.

The development of optical masers or lasers, as they are now commonly known, has made possible the generation and amplification of coherent and highly monochromatic electromagnetic wave energy in the optical frequency range which is deemed to extend from the farthest infrared to beyond the ultraviolet. Lasers operable in the optical frequency range typically comprise an optical cavity resonator in which there is disposed an appropriate active medium. Devices of this type employing a cavity resonator formed by a pair of spaced parallel reflective plates are disclosed in United States Patent No. 2,929,922 to Schawlow and Townes. Resonators of this and other types have been analyzed in articles in the Bell System Technical Journal: see, for example, articles by Fox and Li, volume 40, page 453; by Boyd and Gordon, volume 40, page 489; and by Boyd and Kogelnik, volume 41, page 1347.

As a practical matter, the dimensions of optical resonators employed in lasers are on the order of several thousand times as large as the wavelengths generated by such devices. The resonators tend therefore to be multimode devices. That is, they are capable of supporting a plurality of modes at distinct but closely spaced optical frequencies as well as modes which, while all of a single frequency, differ in the direction of propagation of the electromagnetic wave energy. The mode structure of optical resinators is in general strongly dependent upon its geometry and dimensions. Thus, the output of a laser employing this type of cavity is subject to frequency variations resulting from mechanical and thermal as well as other environmental fluctuations and changes.

Many actual and potential applications of the laser, however, are of the type which makes use of the unique bandwidth and frequency characteristics of the laser output in the optical spectrum. In many of these applications it is considered highly desirable that the laser output frequency have maximum stability. A frequency stabilized optical maser, for example, is capable of providing a convenient optical frequency standard of extremely high accuracy. This is so because the line width of the laser emission is considerably less than the width of the corresponding spectral line of the active laser medium. The output of such a device may also provide a standard of length based on optical wavelengths and characterized by a degree of precision hitherto unattainable.

Furthermore, in optical communication systems employing the tremendous information carrying capacity of laser beams it is considered of some importance that the beam sources be capable of supplying a stable, coherent output at virtually a single optical frequency that can be set to match and be maintained accurately at the frequency of the output of a separate and completely independent laser. Although the above-mentioned applications of lasers are but examples, it may be said in general that the ultimate usefulness of the laser as a research tool and as a communications device is likely to be strongly influenced by the frequency stability that may be obtained.

A system for stabilizing the output of a laser which oscillates simultaneously at several distinct frequencies within a single inhomogeneously broadened emission line is disclosed in United States patent application Ser. No. 148,338, filed Oct. 30, 1961, now Patent No. 3,170,122, issued February 16, 1965 by W. R. Bennett, Jr. and assigned to the assignee hereof. The technique there disclosed is not applicable to lasers which operate at a single frequency. Much of the previous effort aimed at stabilizing the output frequency of single frequency lasers—such as those disclosed by Gordon and White in the Proceedings of the IEEE, volume 52, page 206—has been directed to the problem of isolating the laser from environmental perturbations. However, prior systems employing feedback stabilization of a single frequency laser are disclosed for example, by Rowley and Wilson in Nature, volume 200, page 745 and by Ballik in Physics Letters, volume 4, page 173.

In systems of the type disclosed by Rowley and Wilson, the laser output is frequency modulated about a mean value. The frequency modulated laser output is directed to a photodetector, the output of which is amplitude modulated when the mean value differs from the center of the gain-frequency profile and is unmodulated when the difference is zero. Thus the mean value is stabilized at the center of a Doppler broadened emission line. In many applications, however, the unavoidable frequency modulation of the laser output of this system is considered an undesirable feature.

This problem is avoided in systems of the type disclosed by Ballik in which the laser output frequency is locked to an external optical cavity resonator. The frequency of the external cavity is varied periodically to produce the discriminant, i.e., a discriminator output. Unfortunately, the mean frequency of the external cavity can drift. The problem of isolating a passive optical resonator from environmental perturbations is somewhat simpler than that of isolating the laser cavity itself, but the difficulty is merely transferred rather than eliminated. Such a system has a further disadvantage in that it is not resettable, i.e., it can not be depended upon to produce precisely the same output frequency at different times and places due to its sensitivity to environmental conditions. Moreover, as there is no fixed relation between the output frequencies of two separate systems of the same design, its use for communications purposes is subject to difficulties.

The present invention includes a system for stabilizing the output frequency of a laser with respect to a predetermined reference frequency. The reference frequency can be selected so as to depend only on the properties of an atomic or molecular emission or absorption line. In a preferred embodiment, a discriminant is derived from the laser transition's absorption or gain frequency profile. Since the characteristics of spectral lines, including the absorption profiles, exhibit a much lower sensitivity to environmental perturbations than do the properties of a macroscopic optical resonator, a relatively high degree of stability may be achieved. Indeed, the properties of spectral lines may be considered invariant under normal environmental fluctuations so that lasers employing the invention can not only be stabilized but can be reset to virtually the same frequency at various times and places. It is also possible to stabilize a laser at a frequency which differs by a precise amount from the frequency of a separate laser.

The present invention enables stabilization of optical masers without necessitating any intensity or frequency modulation of the laser output. Since it utilizes a discriminant derived from the properties of atoms or molecules in an external control circuit, it is effective with optical masers operating at a single frequency and imposes no conditions on the laser output which, therefore, may be optimized for a particular application without regard to the stabilization apparatus.

The discriminant of the invention is derived by passing the laser light through an absorption channel having a split absorption-frequency profile. Two portions of the split profile intersect at a predetermined frequency. Means are provided for sampling the absorption corresponding to the split profile portions. The absorption is equal for both portions at the intersection frequency, and unequal at other frequencies. The absorptions are compared to produce the discriminant.

The objects and features of the invention will be fully and clearly understood from the following description taken in conjunction with the accompanying drawing in which.

Figure 1:
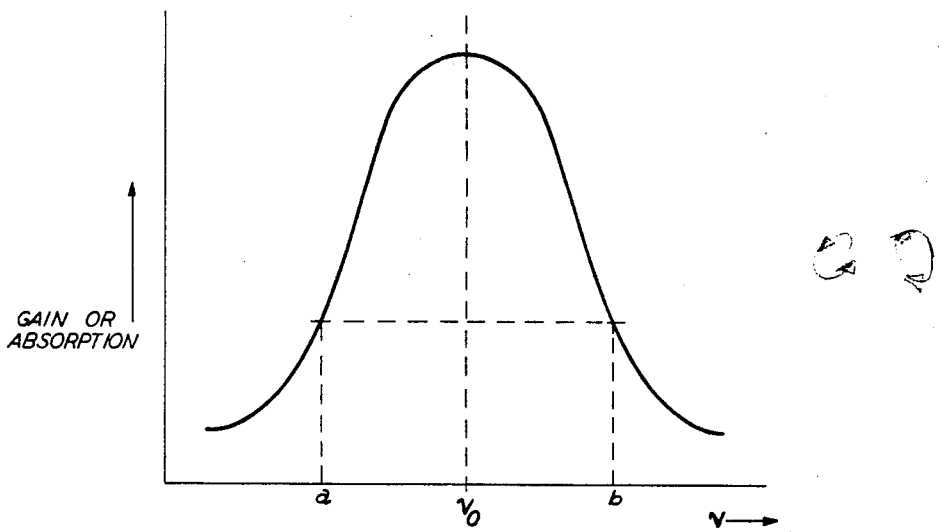
FIG. 1 illustrates the absorption or gain profile of a typical Doppler broadened spectral line.

Referring now to FIG. 1 there is shown a typical absorption-frequency profile of a Doppler broadened spectral line. Units of absorption (or gain) are measured on the abscissa. Although the following discussion will be primarily in terms of absorption profiles, it is to be understood that equivalent remarks also apply to gain profiles. Since, in general, the absorption can be made larger than the gain for a given length of optical path, it is easier to use absorption. The correspondence between gain and absorption may be understood by noting that gain may be regarded as negative absorption. Thus, the curve of FIG. 1 may also be taken to represent the profile of a Doppler broadened laser transition. While the profile shown covers an appreciable range of frequencies about the center frequency $\nu_0$, the coherent output of a laser operating on this transition may be restricted to substantially a single frequency within the range over which the gain exceeds a threshold value. Such a range is that between points $a$ and $b$ which includes portions of the gain profile lying above the threshold indicated by the horizontal dashed line. The frequency of a laser output may drift or fluctuate over the range $ab$ due to environmental or internal changes.

In accordance with the invention, apparatus is provided for deriving a discriminant or signal which is a measure of the difference between the laser output frequency and $\nu_0$, the center of the Doppler broadened emission line, or between the laser output frequency and an arbitrary frequency distinct from $\nu_0$. Such a discriminant may be used to drive a feedback loop which includes a control circuit for tuning the laser. Thus, the discriminant provides a means for returning the laser output frequency to a predetermined value whenever it is found to depart therefrom.

Figure 2A:
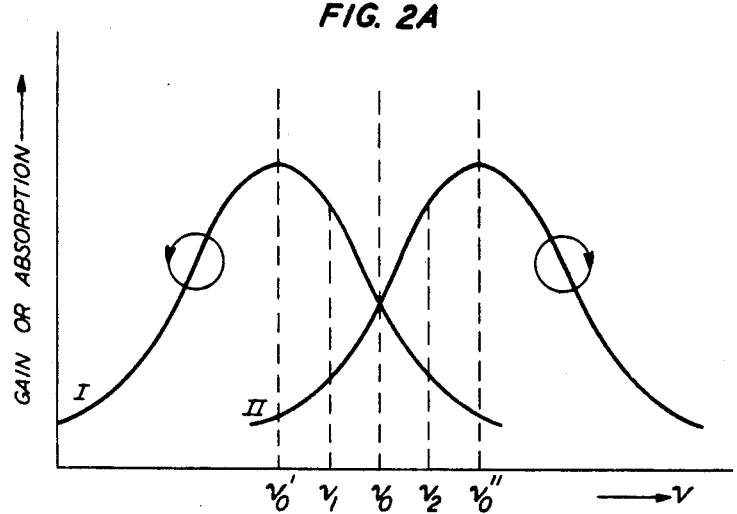
FIG. 2A illustrates a split absorption or gain profile of a type employed in the invention.

Following the principles of the invention, the discriminant or error signal is derived from means characterized by a split absorption profile of the type illustrated in FIG. 2A. The split profile consists of two separate profiles having peak values at frequencies distinct from the center frequency $\nu_0$ of the Doppler broadened laser transition. Thus, the profile curve I has a peak value at a frequency $\nu_0'$ which is lower than $\nu_0$ while the profile curve II has its peak value at $\nu_0''$ above $\nu_0$.

As illustrated in FIG. 2A the profile curves I and II intersect at $\nu_0$. It will be understood of course, that apparatus embodying the invention may be designed or adjusted so that the two profile curves intersect at any other frequency within the range $ab$ shown in FIG. 1. Preferably, the split portions of the absorption profile have peak values near the laser transition so that their values at the intersection frequency are substantial. An effective split profile may be achieved by providing two separate absorption channels, one of which is characterized by a profile having a peak value at a frequency lower, while the other has its peak value at a frequency higher, than the predetermined frequency. Alternatively, a single absorption channel may be provided together with means for switching the channel alternately between a condition in which it has a profile with a peak value below the predetermined frequency and a condition in which it has a peak value at a frequency higher than the predetermined frequency. In another arrangement the two displaced profiles exist simultaneously in a single absorption channel and means external thereto are provided for periodically sampling their magnitudes.

The discriminant is formed by allowing the laser output beam to explore the absorption frequency profiles of the absorption channels. It can be seen by inspection of FIG. 2A that the absorption of light at the laser frequency will be the same for both absorption channels or conditions of the apparatus when the laser frequency is equal to the frequency at which the absorption profiles intersect, i.e., at $\nu_0$. It can be seen, further, that when the laser frequency falls to $\nu_1$ the laser light will undergo greater absorption in the channel or condition characterized by the absorption profile I than it will in the channel or condition characterized by the profile II. Similarly, when the laser frequency drifts above $\nu_0$, for example to $\nu_2$, greater absorption is experienced in the channel or condition characterized by profile curve II than in that characterized by profile curve I.

Figure 2B:
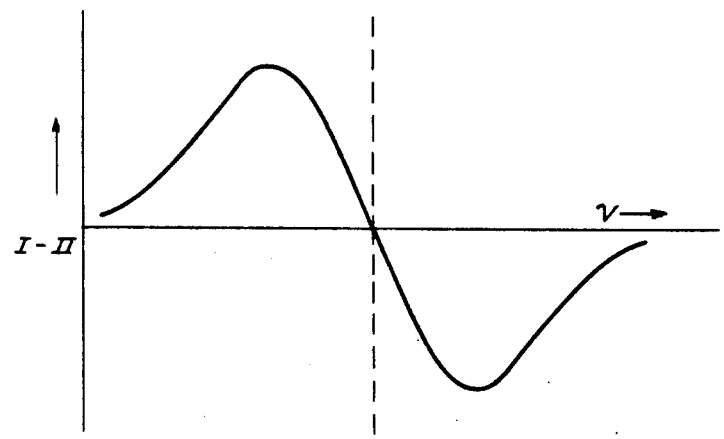
FIG. 2B is a plot of the algebraic difference between the split profile portions of FIG. 2A.

A plot of the algebraic difference between the two absorption profiles versus frequency takes the form of the curve shown in FIG. 2B. Thus, the difference between the amounts of absorption experienced by laser light in the two absorption channels or conditions of apparatus embodying the invention provides the desired discriminant which measures the difference between the laser frequency and the predetermined frequency at which the absorption profiles intersect. As indicated by FIG. 2B, the discriminant will be equal to zero at the predetermined frequency and will have finite values of opposite sign above and below that frequency.

Figure 3:
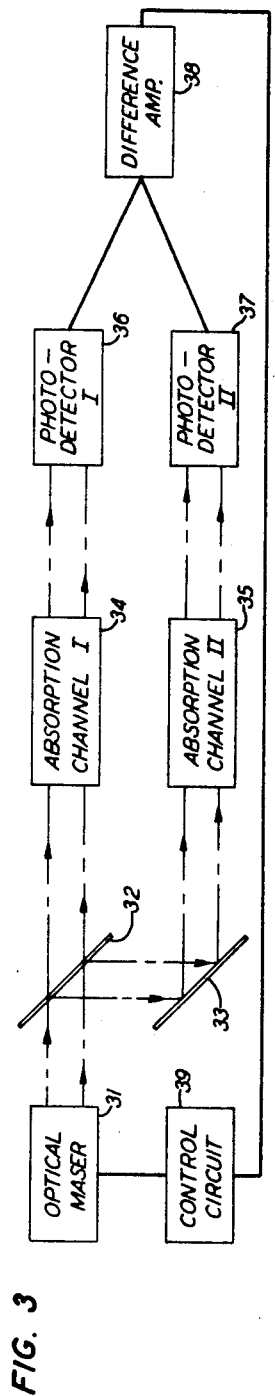
FIG. 3 is a block schematic of a system illustrating the basic principles of the invention.

FIG. 3 is a block schematic of a system embodying the principles of the invention. In the illustrated embodiment the output of an optical maser or laser 31 is divided into two portions by the semitransparent reflector 32 which transmits a first portion to a first absorption channel 34 having an absorption line profile corresponding to the curve I of FIG. 2A. A second portion of the laser output is directed to a reflector 33 which reflects it to a second absorption channel 35 having a line profile corresponding to curve II of FIG. 2A. The absorption channels I and II are substantially identical in all material respects except that their absorption profiles are displaced—one up and one down—with respect to a predetermined frequency which lies within the Doppler broadened laser transition.

Laser light which enters either of the absorption channels is partially absorbed therein. The unabsorbed portion passes through to detection means such as photodetectors 36 and 37. The output of each photodetector, which is proportional to the intensity of the laser light passing through the corresponding absorption channel, is fed to a difference amplifier 38 which compares the two input signals and produces an amplified output proportional to the algebraic difference between them. The difference is a discriminant which is a measure of the departure of the laser output frequency from the frequency at which the absorption profiles I and II intersect. The output of difference amplifier 38 is fed to a control circuit 39 which tunes the laser 31. The control circuit is adapted to increase or decrease the laser output frequency depending on whether the output of the difference amplifier indicates a positive or negative deviation from the predetermined frequency. For example, the laser cavity may be tuned by varying its dimensions with a piezoelectric or a magnetostrictive control member. Other methods of tuning a laser may also be controlled by the discriminant of the invention. Such methods are known in the art and need not be discussed herein.

The absorption channels I and II may take a variety of forms. For example, if the active medium of the laser 31 is natural neon, i.e., a mixture of the isotopes $Ne^{20}$ and $Ne^{22}$, then one of the channels may advantageously include a discharge absorption cell filled with one of the neon isotopes while the other channel includes a discharge absorption cell filled with the other isotope. The spectra of the two istopes are structurally identical but are displaced slightly in frequency with respect to each other. The absorption profile of one isotope has a peak value below the output frequency of the natural neon laser while the other isotope has an absorption profile with a peak value above the natural neon laser frequency. The two absorption profiles intersect at a frequency near the center of the neon laser emission line thus meeting the requirements of the invention. Isotopic profile splitting in other substances used as active laser media may be similarly employed, as may overlapping lines of different substances. Electric or magnetic field induced splitting may also be used, as well as two tubes containing the same isotope at different pressures. Line profile splitting also results from periodic reversal of the current in a discharge tube which causes a synchronous reversal of the Doppler shift due to current induced motions of the excited gas particles.

Although the system of FIG. 3 is illustrative of the invention and may be preferred in particular applications, it is subject to minor difficulties arising from the fact that the absorption channels and the corresponding photodetectors must be balanced with respect to one another so that the photodetector inputs to the difference amplifier 38 are equal when the laser output is at the predetermined frequency. Although the absorption channels are, to some extent, adjustable, the photoconductors are typically subject to variations and fluctuations of a type difficult to compensate.

Figure 4:
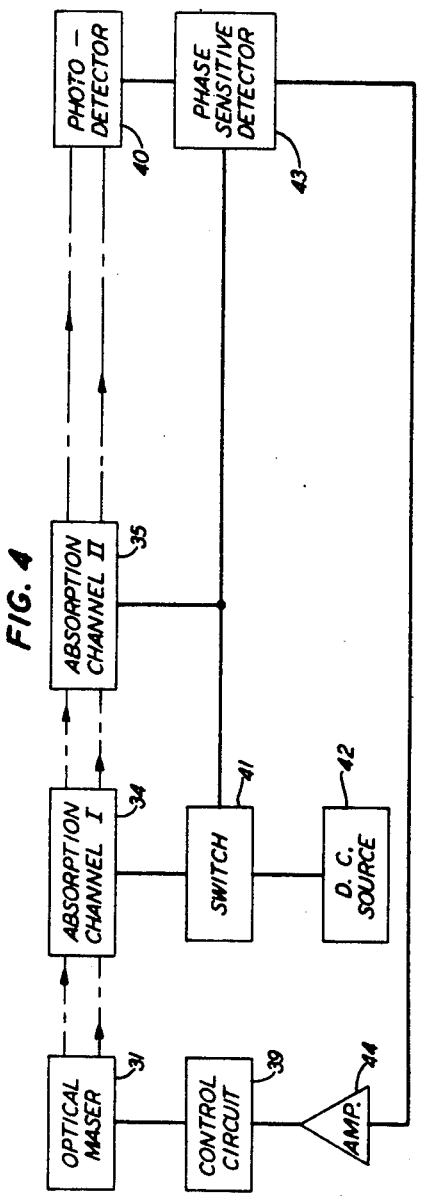
FIG. 4 is a block schematic of a system embodying the invention.

Problems of this type may be avoided by employing a system such as that illustrated in FIG. 4. The absorption channels I and II are there arranged in series so that light from the laser 31 passes first through channel I and thence through channel II to a single photodetector 40. The absorption channels I and II include absorption cells of a type which may be switched from an absorbing condition to a nonabsorbing condition. The gaseous discharge absorption cells utilized in the arrangement of FIG. 3 may be so switched simply by turning the discharge on and off. Thus, in FIG. 4 a switch 41 is provided to connect the DC source 42 alternately to absorption channel I and absorption channel II.

If the laser light traversing the series absorption channels is at the frequency at which the respective absorption profiles intersect, the light received by the photodetector will be of constant intensity. If, however, the laser frequency differs from the predetermined profile intersection frequency, the light incident on the photodetector will be intensity modulated at the switching frequency of the switch 41.

Figure 5A:
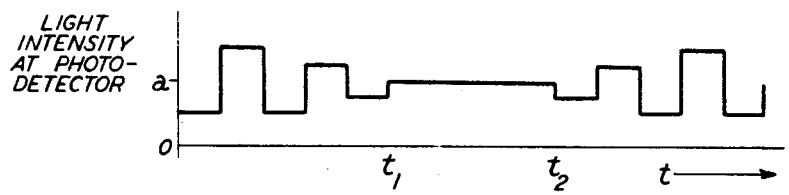
FIGS. 5A and 5B are plots of functions useful in explaining the operation of certain embodiments of the invention.

FIG. 5A illustrates the intensity modulation of the light in the period from O to $t_1$ during which the laser frequency differs from, but moves steadily closer to the predetermined frequency. During the period $t_1$ to $t_2$ the laser frequency coincides with the predetermined frequency. Following the time $t_2$ the laser frequency continues its drift, moving off the predetermined frequency to frequencies on the other side.

Figure 5B:
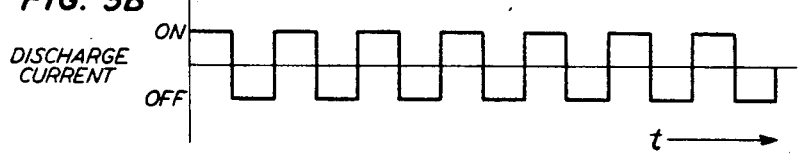

The discharge current in either of the absorption cells is, of course, a manifestation of the switching frequency. This current, assumed to be a square wave, is plotted as a reference in FIG. 5B. It can be seen that when the laser frequency is on one side of the predetermined frequency the intensity modulation of the light striking the photocell is 180 degrees out of phase with the reference, while the modulation is in phase with the reference when the laser frequency is on the other side of the predetermined frequency. Thus, by feeding the photodetector output and the reference derived from the switch 41 into a phase sensitive detector, such as a homodyne detector or a synchronous demodulator, a discriminant is derived which is related in magnitude and phase to the difference between the laser frequency and the predetermined intersection frequency of the absorption profiles. The magnitude of the discriminant indicates the extent of the laser's drift, while the phase indicates whether it is above or below the predetermined frequency. The output of the phase sensitive detector 43 is fed to an amplifier 44 and thence directed to control circuit 39 for tuning the laser 31 with respect to the predetermined frequency.

Figure 6:
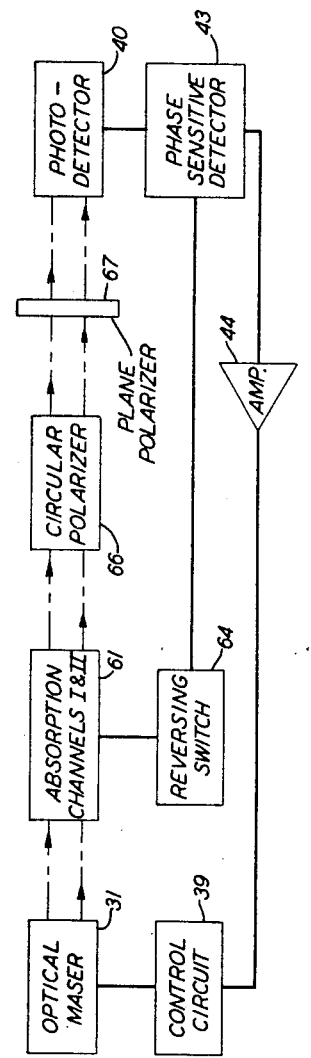
FIGS. 6 and 7 are block schematics of systems embodying the invention.

In the system illustrated in FIG. 6 both absorption channels are provided in a single unit 61 which includes a medium having an absorption profile encompassing the laser frequency and capable of being split into two separate but intersecting profiles such as those illustrated in FIG. 2A. Advantageously, the absorption medium is one which exhibits line profile splitting under the influence of an electric or a magnetic field. It is convenient to use as the absorbing medium the same substance that is employed as the active medium of the laser to be stabilized. By applying an appropriate magnetic field to such a medium the laser transition, i.e., the transition from which the stimulated emission is produced in the laser 31, may be split substantially symmetrically about its center frequency. One portion of the absorption profile of the laser transition is shifted down with respect to the center frequency while another portion is shifted up. The displaced profiles interact with or absorb right and left circularly polarized light, respectively. The opposite senses of circular polarization are indicated in FIG. 2A by the circular arrows.

The sense of circular polarization with which each portion of the absorption profile interacts may be reversed simply by reversing the direction of an axial magnetic field acting on the medium. A similar reversal may be achieved by rotating a transverse magnetic field by 90°. In the system shown in FIG. 6 the senses of circular polarization corresponding to the portions of the split absorption profile are periodically reversed by a reversing switch 64 which may reverse an applied magnetic field, for example.

Light from the laser 31 typically is linearly polarized and may be regarded as composed of two equal components which are circularly polarized in opposite senses. Each component will interact with the corresponding portion of the absorption profile. If the laser light is at frequency $\nu_0$, then the absorption undergone by the two components is equal and the reversal of the senses of the circular polarization of the absorption profiles has no effect on the amount of absorption experienced by either component. If, on the other hand, the laser frequency is at $\nu_1$, then the left and right circularly polarized components experience unequal amounts of absorption. Thus, the periodic reversal of the senses of circular polarization corresponding to the portions of the absorption profile results in intensity modulation of both the right and the left circularly polarized components. A similar situation prevails if the laser frequency is at $\nu_2$.

In order to determine whether either component is intensity modulated, a circular polarizer 66 and a plane polarizer 67 are inserted between the absorption cell 61 and the photodetector 40. The polarizers 66 and 67, in combination, pass only a single sense of circularly polarized light. Thus either the right or the left circularly polarized component of the laser light will be incident on the photodetector 40. The output of the photodetector 40 and a reference signal derived from the reversing switch 64 are directed to a phase sensitive detector 43 which extracts the discriminant in the manner described above.

Although the circular polarizer 66 is shown in FIG. 6 as located between the absorption structure 61 and the photodetector 40, its position with respect to the absorption unit 61 is immaterial. Thus, in FIG. 7 the circular polarizer 66 is located between the laser 31 and the absorption unit 61. Furthermore, in the system represented in FIG. 7, sampling of the absorption profile is achieved by reversing the sense of the circularly polarized laser light passed by the polarizer 66 rather than by reversing the sense of circularly polarized light corresponding to the split portions of the absorption profile. The sense of circular polarization may be switched periodically by means of a linear electro-optic shutter such as KDP driven periodically to a phase shift of $\pm\pi/2$. The shutter acts, in effect, as a switched quarter-wave plate. The same function would be served by a rotating quarter-wave plate. As before, the modulation of the transmitted circularly polarized component of the laser light, in conjunction with a phase sensitive detector using the switching voltage as a reference, yields the frequency discriminant which is used to drive a feedback circuit for controlling the laser output frequency.

Figure 7:
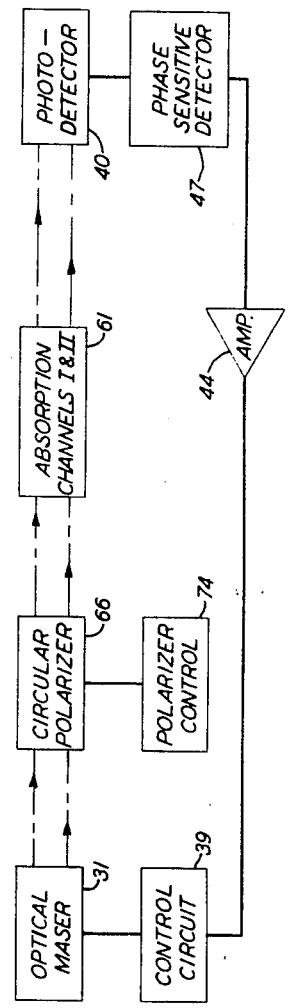

Although the invention has been described with particular reference to specific illustrative embodiments, many variations and modifications thereof are possible and may be made by those skilled in the art without departing from the scope and spirit thereof. For example, discharge tubes in which the absorption profiles for opposite senses of circularly polarized light are split by an applied electric or magnetic field are illustrated in the systems of FIGS. 6 and 7. However, such absorption cells may also be used in systems such as those depicted in FIGS. 3 and 4. Moreover, by superimposing a uniform DC biasing field on the line splitting field, it is possible to tune the stabilization frequency of the discriminant. Furthermore, while the examples have been discussed in terms of square-wave modulation, the function of the discriminator is not changed by the use of sinusoidal modulation, although the amplitude of the discriminant will be decreased somewhat.

In systems such as that of FIG. 7, where the circular polarization of the laser light is modulated rather than the split absorption profile of the medium in the absorption unit, permanent magnets may be used in place of solenoids for establishing the splitting field. Systems using modulation of the circular polarization of the laser light are capable of operation at much higher frequencies than those using modulation of the splitting field. Apparatus of this type may be employed as a demodulator to detect frequency modulation of the laser output. However, the latter type of system has the advantage in that the stabilization frequency can be more conveniently tuned. The tuning sensitivity for a neon filled absorption discharge tube is of the order of 1.8 megacycles per gauss. The stabilization frequency may also be tuned in either type of system by changing the pressure of the gas in the absorption tube or by changing the discharge current. The pressure tuning sensitivity of a neon tube is of the order of two to five megacycles per torr.

Absorption profile splitting may also be achieved independently of the light polarization by utilizing absorption in an ionizing DC discharge wherein the laser transition is associated with the ions. By periodically reversing the direction of current flow in the discharge tube the motion of the excited ions is periodically reversed. Line profile splitting results from the Doppler shift due to the relatively high ionic velocities. Although the invention has been discussed with particular reference to gaseous line splitting media, solids and liquids may also be employed.

What is claimed is:

1. Apparatus for deriving a discriminant which is a measure of the difference between the output frequency of a laser and a predetermined frequency within the laser emission line comprising in combination
   first means for partially absorbing a first portion of the output of a laser,
   said first means having an absorption profile with a peak value at a frequency near the laser emission line at a frequency lower than a predetermined frequency,
   second means for partially absorbing a second portion of the output of the laser,
   said second means having an absorption profile with a peak value at a frequency near the laser emission line at a frequency higher than the predetermined frequency,
   the absorption profiles of said first and second means intersecting at the predetermined frequency,
   and means for comparing the portion of a laser output transmitted through said first means with the portion transmitted through said second means.

2. Apparatus as claimed in claim 1 and further comprising
   means for generating a signal which is functionally related to the algebraic difference between the magnitudes of said transmitted portions.

3. Apparatus as claimed in claim 1 wherein said first and second means comprise
   a single structure having an externally controllable absorption profile,
   and means for controlling the absorption profile to shift the peak value alternately to frequencies above and below the predetermined frequency.

4. Apparatus as claimed in claim 1 and further comprising
   means for splitting the output of a laser into at least two portions for propagation separately through said first and second means.

5. Apparatus as claimed in claim 1 wherein
   said first and second means are arranged in series and further including
   means for alternately rendering said means absorbing and nonabsorbing,
   one of said means being rendered absorbing while the other is rendered nonabsorbing.

6. Apparatus for deriving a discriminant which is a measure of the difference between the output frequency of a laser and a predetermined frequency within the laser emission line comprising in combination
   means adapted to receive a portion of the output of a laser,
   said means including a medium having an absorption profile with a peak value within the laser emission line,
   means for splitting the absorption profile of said medium into first and second portions having peak values above and below the predetermined frequency respectively,
   said profile portions representing absorption of opposite senses of circularly polarized light,
   means for periodically reversing the relation of said profile portions to the sense of circular polarization absorbed,
   means for detecting the intensity of opposite senses of circularly polarized laser light transmitted through said medium,
   and means for comparing the intensities detected before the reversal of said relation to the intensities detected after.

7. Apparatus as claimed in claim 6 wherein said splitting means comprises
   means for applying a magnetic field to said medium.

8. Apparatus as claimed in claim 7 wherein
said magnetic field is axial of said medium and
said reversing means comprises means for reversing the axial direction of said magnetic field.

9. Apparatus for deriving a discriminant which is a measure of the difference between the output frequency of a laser and a predetermined frequency within the laser transition comprising in combination
   means adapted to receive a portion of the output of a laser,
   said means including a medium having a split absorption profile, two portions of which represent absorption of light of opposite senses of circular polarization,
   said two portions intersecting at a frequency within the laser transition,
   means for sensing the magnitude of each of said two profile portions at the laser output frequency,
   and means for comparing the sensed magnitudes to produce an output signal proportional to the algebraic difference therebetween.

10. Apparatus as claimed in claim 9 wherein said output receiving means comprises
    means for circularly polarizing laser light interacting with said split profile medium,
    said means being reversible to produce alternately right and left circular polarization,
    and means for periodically reversing the sense of circular polarization produced by said circular polarizing means.

No references cited.

JEWELL H. PEDERSEN, *Primary Examiner.*

B. W. DE LOS REYES, *Assistant Examiner.*